(12) United States Patent
Zhang et al.

(10) Patent No.: US 12,725,840 B2
(45) Date of Patent: Sep. 1, 2026

(54) SYSTEM FOR CALCULATING A MAXIMUM POWER LIMIT FOR A BATTERY PACK

(71) Applicant: GM Global Technology Operations LLC, Detroit, MI (US)

(72) Inventors: Han Zhang, Shelby Township, MI (US); Yong Miao, Ann Arbor, MI (US); Erin Efimoff, Oak Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 545 days.

(21) Appl. No.: 18/490,198

(22) Filed: Oct. 19, 2023

(65) Prior Publication Data

US 2025/0132406 A1 Apr. 24, 2025

(51) Int. Cl.

| | |
|---|---|
| ***G01R 31/36*** | (2020.01) |
| ***G01R 31/387*** | (2019.01) |
| ***G01R 31/389*** | (2019.01) |
| ***H01M 10/42*** | (2006.01) |
| ***H01M 10/48*** | (2006.01) |
| ***H02J 7/82*** | (2026.01) |

(52) U.S. Cl.
CPC ..... *H01M 10/4285* (2013.01); *H01M 10/486* (2013.01); *H02J 7/82* (2026.01); *H01M 2220/10* (2013.01)

(58) Field of Classification Search
CPC ........... H01M 10/4285; H01M 10/486; H01M 2220/10; H01M 10/425; H01M 2220/20; H02J 7/82; G01R 31/3647; G01R 31/389; G01R 31/396; G01R 21/06; G01R 31/385
See application file for complete search history.

(56) References Cited

U.S. PATENT DOCUMENTS

| | | | | |
|---|---|---|---|---|
| 2005/0035742 A1* | 2/2005 | Koo | G01R 31/3842 | 320/149 |
| 2014/0009117 A1* | 1/2014 | Ishii | H01M 10/425 | 320/126 |
| 2014/0302355 A1* | 10/2014 | Boehm | B60L 58/16 | 324/426 |
| 2015/0032394 A1* | 1/2015 | Kimura | G01R 31/367 | 702/63 |
| 2015/0108991 A1* | 4/2015 | Aoshima | G01R 31/374 | 324/430 |
| 2019/0143820 A1* | 5/2019 | Ying | B60L 53/11 | 307/10.6 |
| 2022/0163591 A1* | 5/2022 | Matthey | G01R 31/367 | |

FOREIGN PATENT DOCUMENTS

| | | |
|---|---|---|
| CN | 108663620 A * | 10/2018 |
| DE | 102004003164 A1 | 3/2005 |
| DE | 102010062856 A1 | 6/2012 |
| DE | 102018127530 A1 | 5/2019 |

* cited by examiner

*Primary Examiner* — Elim Ortiz

(74) *Attorney, Agent, or Firm* — Vivacqua Crane, PLLC

(57) ABSTRACT

A system for calculating the maximum power limit of a battery pack for an electric vehicle includes one or more controllers in electronic communication with the battery pack. A plurality of battery open circuit voltage look-up tables and a plurality of direct current internal resistance (DCIR) look-up tables are stored in memory of the one or more controllers.

20 Claims, 2 Drawing Sheets

200
202
204
206
208
210

300
302
304
306
308
310
312
N
Y
314

400
402
404
406
N
Y
408

SYSTEM FOR CALCULATING A MAXIMUM POWER LIMIT FOR A BATTERY PACK

INTRODUCTION

The present disclosure relates to a system for calculating the maximum power limit for a battery pack of an electric vehicle.

An electric vehicle is powered by an electric motor, where the electric motor is provided with electric power by a rechargeable battery pack. The maximum power of a vehicle is limited by the maximum power limit of the battery pack. The maximum power limit of a battery varies over time, and is a function of several factors such as, but not limited to, a battery state-of-charge (SOC), a rate of charge and discharge of the battery (which is also referred to as the C-rate), and temperature. It is to be appreciated that the amount of available voltage that a battery provides varies as the battery discharges. When the charge level of a battery is relatively low, then the amount of available voltage is also proportionally low. Thus, more current is required to produce the same level of power in a battery with a relatively low charge level when compared to a fully charged battery.

The are several electrochemical-based battery models currently available that may be utilized to calculate the maximum power limit of a battery. However, the electrochemical-based battery models for calculating the maximum power limit for a battery require significant computing resources and memory.

Thus, while current batteries for electric vehicles achieve their intended purpose, there is a need in the art for an improved approach for calculating the maximum power limit for a battery.

SUMMARY

According to several aspects, a system for a battery pack is disclosed and includes one or more controllers in electronic communication with the battery pack. A plurality of battery open circuit voltage look-up tables and a plurality of direct current internal resistance (DCIR) look-up tables are stored in memory of the one or more controllers. The one or more controllers execute instructions to receive, by the one or more controllers, a discharge current of the battery pack, a state-of-charge of the battery pack, and a battery temperature of the battery pack. The one or more controllers interpolate a value indicating a direct current internal resistance of the battery pack from the plurality of DCIR look-up tables based on the discharge current, the state-of-charge, and the battery temperature of the battery pack. The one or more controllers interpolate a value indicating an open circuit voltage of the battery pack from the plurality of battery open circuit voltage look-up tables based on the state-of-charge and the battery temperature of the battery pack. The one or more controllers calculate a first maximum power limit of the battery pack based on the open circuit voltage, the direct current internal resistance, and the discharge current of the battery pack.

In another aspect, the one or more controllers execute instructions to calculate a second maximum power limit of the battery pack based on a voltage of the battery pack, the state-of-charge of the battery pack, the battery temperature of the battery pack, and a power request indicating an amount of power presently being requested from the battery pack.

In yet another aspect, calculating the second maximum power limit of the battery pack includes determining an estimated discharge current value based on the open circuit voltage of the battery pack and the power request of the battery pack.

In an aspect, the one or more controllers execute instructions to determine the estimated discharge current value based on the following:

$$\text{Estimated } I_D = \text{power request}/V_{OCV}$$

where $V_{OCV}$ represents the open circuit voltage of the battery pack and $I_D$ represents the discharge current of the battery pack.

In another aspect, calculating the second maximum power limit of the battery pack includes interpolating a second value indicating the direct current internal resistance of the battery pack from the plurality of DCIR look-up tables based on the estimated discharge current value, the state-of-charge, and the battery temperature of the battery pack, and calculating the second maximum power limit of the battery pack based on the open circuit voltage, the second value of the direct current internal resistance, and the discharge current of the battery pack.

In yet another aspect, the one or more controllers execute instructions to compare the first maximum power limit with the second maximum power of the battery pack and select a maximum power value limit having the greatest value as a final maximum power limit of the battery pack.

In an aspect, the one or more controllers execute instructions to determine a real-time power of the battery pack based on a real-time voltage of the battery pack and a real-time discharge current of the battery pack.

In an aspect, the one or more controllers execute instructions to compare the real-time power of the battery pack with the final maximum power limit of the battery pack and in response to determining the real-time power of the battery pack is greater than the final maximum power limit of the battery pack, generate a control signal that instructs the battery pack to reduce the real-time power of the battery pack to the final maximum power limit of the battery pack.

In another aspect, the first maximum power limit and the second maximum power limit of the battery pack is determined based on the following:

$$\text{Maximum Power Limit} = V_{OCV} * I_D - (I_D)^2 R_{DCIR}$$

where $V_{OCV}$ represents the open circuit voltage of the battery pack, $R_{DCIR}$ represents the direct current internal resistance of the battery pack, and $I_D$ represents the discharge current of the battery pack.

In yet another aspect, the one or more controllers execute instructions to determine a voltage of the battery pack based on the open circuit voltage, the direct current internal resistance, and the discharge current of the battery pack.

In an aspect, the voltage of the battery pack is determined based on the following:

$$\text{Voltage} = V_{OCV} - R_{DCIR} * I_D$$

where $V_{OCV}$ represents the open circuit voltage of the battery pack, $R_{DCIR}$ represents the direct current internal resistance of the battery pack, and $I_D$ represents the discharge current of the battery pack.

In another aspect, the plurality of battery open circuit voltage look-up tables are each one-dimensional look-up tables that indicate an open circuit voltage of the battery pack based on the state-of-charge of the battery pack at a specific temperature.

In yet another aspect, the plurality of DCIR look-up tables are each two-dimensional look-up tables that indicate the direct current internal resistance of the battery pack based on the state-of-charge of the battery pack and the discharge current of the battery pack at a specific temperature.

In an aspect, the one or more controllers are in electronic communication with one or more current sensors that monitor the discharge current of the battery pack.

In another aspect, the one or more controllers are in electronic communication with one or more state-of-charge sensors that monitor the state-of-charge of the battery pack.

In yet another aspect, the one or more controllers are in electronic communication with one or more temperature sensors to monitor the battery temperature of the battery pack.

In an aspect, a method for calculating a final maximum power limit of a battery pack for an electric vehicle is disclosed. The method includes receiving, by one or more controllers, a voltage of the battery pack, a discharge current of the battery pack, a state-of-charge of the battery pack, a battery temperature of the battery pack, and a power request indicating an amount of power presently being requested from the battery pack. The method includes interpolating a value indicating a direct current internal resistance of the battery pack from a plurality of DCIR look-up tables based on the discharge current, the state-of-charge, and the battery temperature of the battery pack, where a plurality of battery open circuit voltage look-up tables and the plurality of DCIR look-up tables are stored in memory of the one or more controllers. The method includes interpolating a value indicating an open circuit voltage of the battery pack from the plurality of battery open circuit voltage look-up tables based on the state-of-charge and the battery temperature of the battery pack. The method includes calculating a first maximum power limit of the battery pack based on the open circuit voltage, the direct current internal resistance, and the discharge current of the battery pack. The method includes calculating a second maximum power limit of the battery pack based on the voltage of the battery pack, the state-of-charge of the battery pack, the battery temperature of the battery pack, and the power request. The method includes comparing the first maximum power limit with the second maximum power of the battery pack. Finally, the method includes selecting a maximum power value limit having the greatest value as the final maximum power of the battery pack.

In another aspect, the method further includes determine a real-time power of the battery pack based on a real-time voltage of the battery pack and a real-time discharge current of the battery pack, compare the real-time power of the battery pack with the final maximum power limit of the battery pack, and in response to determining the real-time power of the battery pack is greater than the final maximum power limit of the battery pack, generating a control signal that instructs the battery pack to reduce the real-time power of the battery pack to the final maximum power limit of the battery pack.

In yet another aspect, the method further comprises determining the first maximum power limit and the second maximum power limit of the battery pack based on the following:

$$\text{Maximum Power Limit} = V_{OCV} {}^{*} I_D - (I_D)^2 R_{DCIR}$$

where $V_{OCV}$ represents the open circuit voltage of the battery pack, $R_{DCIR}$ represents the direct current internal resistance of the battery pack, and $I_D$ represents the discharge current of the battery pack.

In an aspect, a system for calculating a maximum power limit of a battery pack for an electric vehicle. The system includes one or more controllers in electronic communication with the battery pack. A plurality of battery open circuit voltage look-up tables and a plurality of DCIR look-up tables are stored in memory of the one or more controllers. The one or more controllers execute instructions to receive, by the one or more controllers, a discharge current of the battery pack, a voltage of the battery pack, a state-of-charge of the battery pack, a battery temperature of the battery pack, and a power request indicating an amount of power presently being requested from the battery pack. The one or more controllers interpolate a value indicating a direct current internal resistance of the battery pack from the plurality of DCIR look-up tables based on the discharge current, the state-of-charge, and the battery temperature of the battery pack. The one or more controllers interpolate a value indicating an open circuit voltage of the battery pack from the plurality of battery open circuit voltage look-up tables based on the state-of-charge and the battery temperature of the battery pack. The one or more controllers calculate a first maximum power limit of the battery pack based on the open circuit voltage, the direct current internal resistance, and the discharge current of the battery pack. The one or more controllers calculate a second maximum power limit of the battery pack based on a voltage of the battery pack, the state-of-charge of the battery pack, the battery temperature of the battery pack, and the power request. The one or more controllers compare the first maximum power limit with the second maximum power of the battery pack and select a maximum power value limit having the greatest value as a final maximum power limit of the battery pack. The one or more controllers determine a real-time power of the battery pack based on a real-time voltage of the battery pack and a real-time discharge current of the battery pack, compare the real-time power of the battery pack with the final maximum power limit of the battery pack, and in response to determining the real-time power of the battery pack is greater than the final maximum power limit of the battery pack, generate a control signal that instructs the battery pack to reduce the real-time power of the battery pack to the final maximum power limit of the battery pack.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
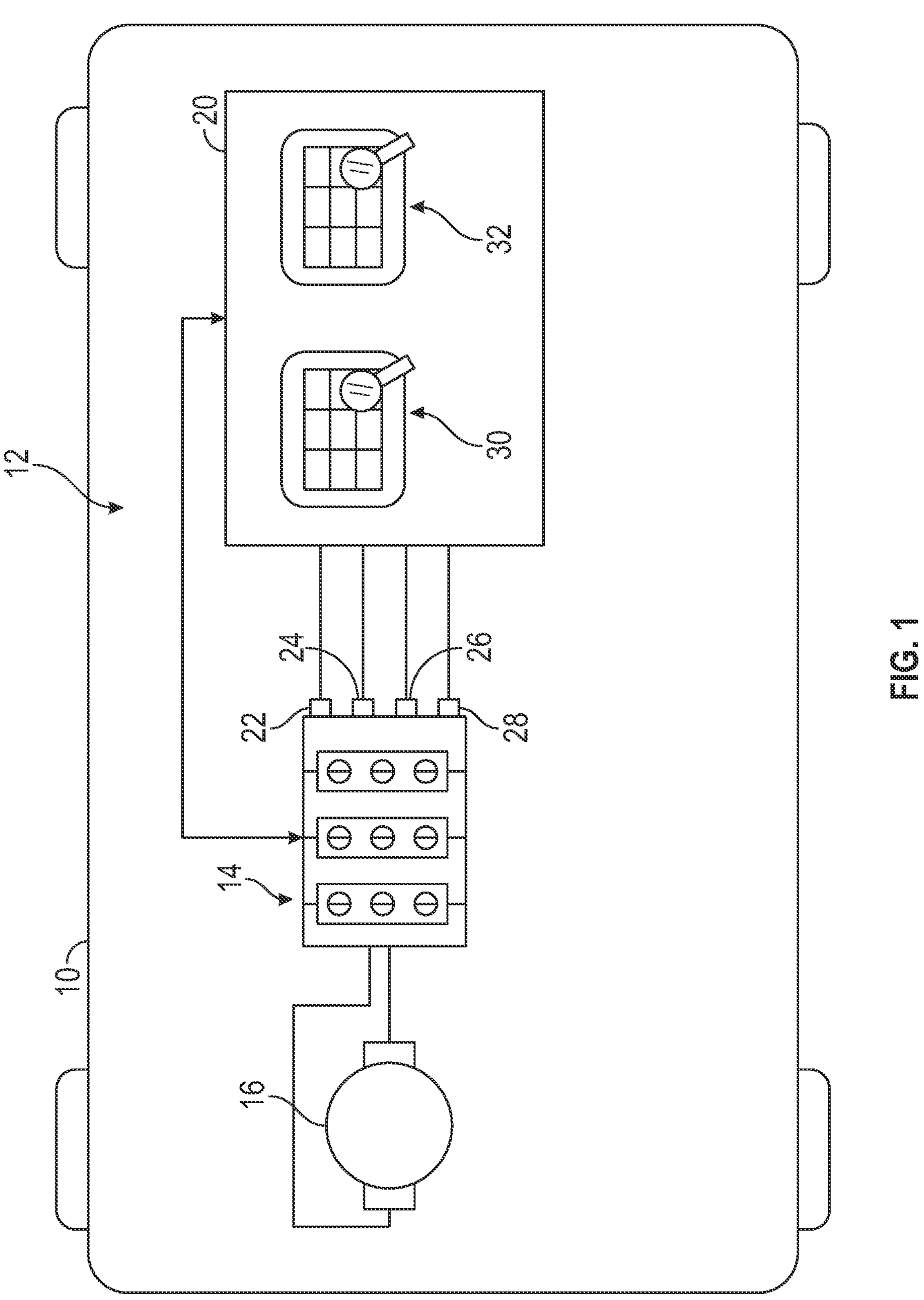
FIG. 1 illustrates a schematic diagram of vehicle including the disclosed system for calculating a maximum power limit for a battery pack, where the battery pack is in electronic communication with one or more controllers, according to an exemplary embodiment.

Referring to FIG. 1, an electric vehicle 10 including the disclosed system 12 for calculating the maximum power limit of a battery pack 14 is illustrated. The battery pack 14 provides motive power to one or more electric motors 16 that propel the electric vehicle 10. It is to be appreciated that the electric vehicle 10 may be any type of vehicle such as, but not limited to, a sedan, a truck, sport utility vehicle, van, or motor home. In the non-limiting embodiment as shown in FIG. 1, the electric vehicle 10 is illustrated as an all-electric vehicle that receives all the motive power from one or more electric motors 16. However, it is to be appreciated that the electric vehicle 10 may also be powered by an electric motor in combination with an internal combustion engine, which is referred to as a plug-in hybrid electric vehicle. It is also to be appreciated that although FIG. 1 illustrates the battery pack 14 as a secondary battery for an electric vehicle, FIG. 1 is merely exemplary in nature and the system 12 is not limited to an electric vehicle. For example, in another embodiment, the system 12 may be used as part of an electric power tool, an electric lawnmower, or an electric dirt bike.

The system 12 includes the battery pack 14 and one or more controllers 20 in electronic communication with the battery pack 14. The one or more controllers 20 are in electronic communication with one or more voltage sensors 22, one or more current sensors 24, one or more state-of-charge (SOC) sensors 26, and one or more temperature sensors 28. The one or more voltage sensors 22 monitor a voltage of the battery pack 14 in real-time, the one or more current sensors 24 monitor a discharge current of the battery pack 14 in real-time, the one or more state-of-charge sensors 26 monitor a state-of-charge of the battery pack 14 in real-time, and the one or more temperature sensors 28 monitor a battery temperature of the battery pack 14 in real-time.

A plurality of battery open circuit voltage look-up tables 30 and a plurality of direct current internal resistance (DCIR) look-up tables 32 are stored in memory of the one or more controllers. The plurality of battery open circuit voltage look-up tables 30 are each one-dimensional look-up tables that indicate an open circuit voltage of the battery pack 14 based on the state-of-charge of the battery pack 14 at a specific temperature. It is to be appreciated that a unique battery open circuit voltage look-up table 30 is provided for a specific battery temperature. The plurality of DCIR look-up tables 32 are each two-dimensional look-up tables that indicate the direct current internal resistance of the battery pack 14 based on the state-of-charge of the battery pack 14 and the discharge current of the battery pack 14 at a specific temperature, where a unique DCIR look-up table 32 is provided for a specific battery temperature. As explained below, the one or more controllers 20 calculate the maximum power limit of the battery pack 14 of the electric vehicle 10 based on the state-of-charge of the battery pack 14, the temperature of the battery pack 14, and either the voltage of the battery pack or the discharge current of the battery pack 14 based on interpolating values from the plurality of battery open circuit voltage look-up tables 30 and the plurality of DCIR look-up tables 32.

Figures 2, 3, 4:
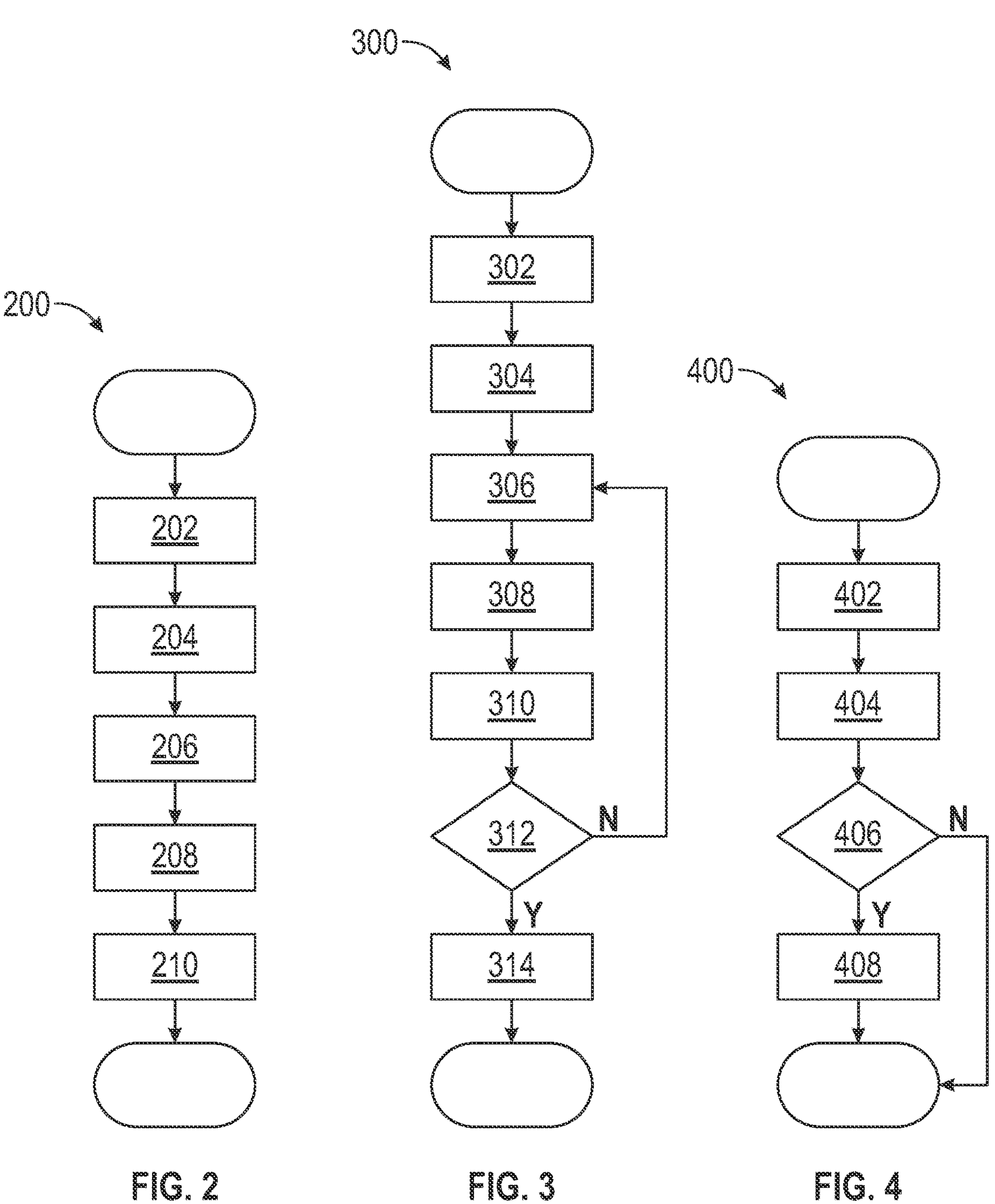
FIG. 2 is a process flow diagram illustrating a method for calculating a first maximum power limit of the battery pack based on a discharge current, a state-of-charge, and a battery temperature of the battery pack, according to an exemplary embodiment.
FIG. 3 is a process flow diagram illustrating a method for calculating a second maximum power limit of the battery pack based on a voltage, a state-of-charge, and a battery temperature of the battery pack, according to an exemplary embodiment.
FIG. 4 is a process flow diagram illustrating a method for determining a final maximum power limit of the battery pack based on the first maximum power limit determined by the method shown in FIG. 2 and the second maximum power limit determined by the method shown in FIG. 3, according to an exemplary embodiment.

An approach to calculate a first maximum power limit of the battery pack 14 based on the discharge current, the state-of-charge, and the battery temperature shall now be described. FIG. 2 is a process flow diagram illustrating a method 200 for calculating the first maximum power limit of the battery pack 14 based on the discharge current. Referring generally to FIGS. 1 and 2, the method 200 may begin at block 202. In block 202, the one or more controllers 20 receive the discharge current of the battery pack 14 from the one or more current sensors 24, the state-of-charge of the battery pack 14 from the one or more state-of-charge sensors 26, and the battery temperature of the battery pack 14 from the one or more temperature sensors 28. The method 200 may then proceed to block 204.

In block 204, the one or more controllers 20 interpolate a value indicating the direct current internal resistance of the battery pack 14 from the plurality of DCIR look-up tables 32 based on the discharge current, the state-of-charge, and the battery temperature of the battery pack 14. The method 200 may then proceed to block 206.

In block 206, the one or more controllers 20 interpolate a value indicating the open circuit voltage of the battery pack 14 from the plurality of battery open circuit voltage look-up tables 30 based on the state-of-charge and the battery temperature of the battery pack 14. The method 200 may then proceed to block 208.

In block 208, the one or more controllers 20 determine the voltage of the battery pack 14 based on the open circuit voltage, the direct current internal resistance $R_{DCIR}$, and the discharge current of the battery pack 14. In one embodiment, the voltage of the battery pack is determined based on Equation 1, which is as follows:

$$\text{Voltage} = V_{OCV} - R_{DCIR} * I_D \qquad \text{Equation 1}$$

where $V_{OCV}$ represents the open circuit voltage of the battery pack 14, $R_{DCIR}$ represents the direct current internal resistance of the battery pack 14, and $I_D$ represents the discharge current of the battery pack 14. The method 200 may then proceed to block 210.

In block 210, the one or more controllers 20 calculate the first maximum power limit of the battery pack 14 based on the open circuit voltage, the direct current internal resistance, and the discharge current of the battery pack 14. In one embodiment, the first maximum power limit of the battery pack 14 is determined based on Equation 2, which is as follows:

$$\text{Maximum Power Limit} = V_{OCV} {}^* I_D - (I_D)^2 R_{DCIR} \qquad \text{Equation 2}$$

The method 200 may then terminate.

An approach to calculate a second maximum power limit of the battery pack 14 based on the voltage, the state-of-charge, and the battery temperature shall now be described. FIG. 3 is a process flow diagram illustrating a method 300 for calculating the second maximum power limit of the battery pack 14 based on the voltage. Referring generally to FIGS. 1 and 3, the method 300 may begin at block 302. In block 302, the one or more controllers 20 receive the voltage of the battery pack 14 from the one or more voltage sensors 22, the state-of-charge of the battery pack 14 from the one or more state-of-charge sensors 26, the battery temperature of the battery pack 14 from the one or more temperature sensors 28, and a power request sent to the battery pack 14. The power request represents an amount of power presently being requested from the battery pack 14 by the one or more controllers 20. The method 300 may then proceed to block 304.

In block 304, the one or more controllers 20 interpolate a value indicating the open circuit voltage $V_{OCV}$ of the battery pack 14 from the plurality of battery open circuit voltage look-up tables 30 based on the state-of-charge and the battery temperature of the battery pack 14. The method 300 may then proceed to block 306.

In block 306, the one or more controllers 20 determine an estimated discharge current value based on the open circuit voltage of the battery pack 14 determined in block 304 and the power request of the battery pack 14, where the power request represents the amount of power presently being requested from the battery pack 14. Specifically, the estimated discharge current value is determined by Equation 3, which is as follows:

$$\text{Estimated } I_D = \text{power request}/V_{OCV} \qquad \text{Equation 3}$$

The method 300 may then proceed to block 308.

In block 308, the one or more controllers 20 interpolate a second value indicating the direct current internal resistance of the battery pack 14 from the plurality of DCIR look-up tables 32 based on the estimated discharge current value, the state-of-charge, and the battery temperature of the battery pack 14. The method 300 may then proceed to block 310.

In block 310, the one or more controllers 20 determine an estimated voltage of the battery pack 14 based on the open circuit voltage $V_{OCV}$, the direct current internal resistance $R_{DCIR}$, and the estimated discharge current value of the battery pack 14. In one embodiment, the estimated voltage of the battery pack 14 is determined based on Equation 4, which is as follows:

$$\text{Estimated Voltage} = V_{OCV} - R_{DCIR} * I_D \qquad \text{Equation 4}$$

The method 300 may then proceed to decision block 312.

In decision block 312, the one or more controllers 20 compare the estimated voltage of the battery pack 14 with a minimum rated voltage of the battery pack 14. It is to be appreciated that the value of the minimum rated voltage of the battery pack 14 is saved in the memory of the one or more controllers 20. In response to determining the estimated voltage is not equal to the minimum rated voltage, the method 300 returns to block 306. Otherwise, the method 300 may proceed to block 314.

In block 314, in response to determining the estimated voltage of the battery pack 14 is equal to the minimum rated voltage of the battery pack 14, the one or more controllers 20 calculate the second maximum power limit of the battery pack 14 based on the open circuit voltage, the direct current internal resistance, and the discharge current of the battery pack 14. In one embodiment, the second maximum power limit of the battery pack 14 is determined based on Equation 2, which is described above. The method 300 may then terminate.

FIG. 4 is a process flow diagram illustrating a method 400 for determining a final maximum power limit of the battery pack 14 based on the first maximum power limit determined by the method 200 shown in FIG. 2 and the second maximum power limit determined by the method 300 shown in FIG. 3. Referring to FIGS. 1 and 4, the method 400 may begin at block 402. In block 402, the one or more controllers 20 compares the first maximum power limit with the second maximum power of the battery pack 14 and selects a maximum power limit having the greatest value as the final maximum power limit of the battery pack 14. The method 400 may then proceed to block 404.

In block 404, the one or more controllers 20 determine a real-time power of the battery pack 14 based on a real-time voltage of the battery pack 14 and a real-time discharge current of the battery pack 14. As seen in FIG. 1, the one or more voltage sensors 22 monitor the real-time voltage of the battery pack 14 and the one or more current sensors 24 monitor the real-time discharge current of the battery pack 14. The method 400 may then proceed to decision block 406.

In decision block 406, the one or more controllers 20 compare the real-time power of the battery pack 14 with the final maximum power limit of the battery pack 14. In response to determining the real-time power of the battery pack 14 is less than or equal to the final maximum power limit of the battery pack 14, the method 400 may terminate. Otherwise, the method 400 proceeds to block 408.

In block 408, in response to determining the real-time power of the battery pack 14 is greater than the final maximum power limit of the battery pack 14, the one or more controllers 20 generate a control signal that instructs the battery pack 14 to reduce the real-time power of the battery pack to the final maximum power limit of the battery pack. The method 400 may then terminate.

Referring generally to the figures, the disclosed system for calculating the maximum power limit of the battery pack provides various technical effects and benefits. Specifically, the system includes one or more controllers that store a plurality of battery open circuit voltage look-up tables that indicate an open circuit voltage of the battery pack as well as a plurality of DCIR look-up tables that indicate a direct current internal resistance of the battery pack. It is to be appreciated that the look-up tables require significantly less computing resources and memory when compared to existing approaches presently available for computing the maximum power limit of the battery pack.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for a battery pack, the system comprising:

one or more controllers in electronic communication with the battery pack, wherein a plurality of battery open circuit voltage look-up tables and a plurality of direct current internal resistance (DCIR) look-up tables are stored in memory of the one or more controllers, and wherein the one or more controllers execute instructions to:

receive, by the one or more controllers, a discharge current of the battery pack, a state-of-charge of the battery pack, and a battery temperature of the battery pack;

interpolate a value indicating a direct current internal resistance of the battery pack from the plurality of DCIR look-up tables based on the discharge current, the state-of-charge, and the battery temperature of the battery pack;

interpolate a value indicating an open circuit voltage of the battery pack from the plurality of battery open circuit voltage look-up tables based on the state-of-charge and the battery temperature of the battery pack; and calculate a first maximum power limit of the battery pack based on the open circuit voltage, the direct current internal resistance, and the discharge current of the battery pack.

2. The system of claim 1, wherein the one or more controllers execute instructions to:

calculate a second maximum power limit of the battery pack based on a voltage of the battery pack, the state-of-charge of the battery pack, the battery temperature of the battery pack, and a power request indicating an amount of power presently being requested from the battery pack.

3. The system of claim 2, wherein calculating the second maximum power limit of the battery pack comprises:

determining an estimated discharge current value based on the open circuit voltage of the battery pack and the power request of the battery pack.

4. The system of claim 3, wherein the one or more controllers execute instructions to:

determine the estimated discharge current value based on the following:

$$\text{Estimated } I_D = \text{power request}/V_{OCV}$$

wherein $V_{OCV}$ represents the open circuit voltage of the battery pack and $I_D$ represents the discharge current of the battery pack.

5. The system of claim 3, wherein calculating the second maximum power limit of the battery pack comprises:

interpolating a second value indicating the direct current internal resistance of the battery pack from the plurality of DCIR look-up tables based on the estimated discharge current value, the state-of-charge, and the battery temperature of the battery pack; and calculating the second maximum power limit of the battery pack based on the open circuit voltage, the second value of the direct current internal resistance, and the discharge current of the battery pack.

6. The system of claim 2, wherein the one or more controllers execute instructions to:

compare the first maximum power limit with the second maximum power of the battery pack; and select a maximum power value limit having the greatest value as a final maximum power limit of the battery pack.

7. The system of claim 6, wherein the one or more controllers execute instructions to:

determine a real-time power of the battery pack based on a real-time voltage of the battery pack and a real-time discharge current of the battery pack.

8. The system of claim 7, wherein the one or more controllers execute instructions to:

compare the real-time power of the battery pack with the final maximum power limit of the battery pack; and in response to determining the real-time power of the battery pack is greater than the final maximum power limit of the battery pack, generate a control signal that instructs the battery pack to reduce the real-time power of the battery pack to the final maximum power limit of the battery pack.

9. The system of claim 2, wherein the first maximum power limit and the second maximum power limit of the battery pack is determined based on the following:

$$\text{Maximum Power Limit} = V_{OCV} * I_D - (I_D)^2 R_{DCIR}$$

wherein $V_{OCV}$ represents the open circuit voltage of the battery pack, $R_{DCIR}$ represents the direct current internal resistance of the battery pack, and $I_D$ represents the discharge current of the battery pack.

10. The system of claim 1, wherein the one or more controllers execute instructions to determine a voltage of the battery pack based on the open circuit voltage, the direct current internal resistance, and the discharge current of the battery pack.

11. The system of claim 10, wherein the voltage of the battery pack is determined based on the following:

$$\text{Voltage} = V_{OCV} - R_{DCIR} * I_D$$

wherein $V_{OCV}$ represents the open circuit voltage of the battery pack, $R_{DCIR}$ represents the direct current internal resistance of the battery pack, and $I_D$ represents the discharge current of the battery pack.

12. The system of claim 1, wherein the plurality of battery open circuit voltage look-up tables are each one-dimensional look-up tables that indicate an open circuit voltage of the battery pack based on the state-of-charge of the battery pack at a specific temperature.

13. The system of claim 1, wherein the plurality of DCIR look-up tables are each two-dimensional look-up tables that indicate the direct current internal resistance of the battery pack based on the state-of-charge of the battery pack and the discharge current of the battery pack at a specific temperature.

14. The system of claim 1, wherein the one or more controllers are in electronic communication with one or more current sensors that monitor the discharge current of the battery pack.

15. The system of claim 1, wherein the one or more controllers are in electronic communication with one or more state-of-charge sensors that monitor the state-of-charge of the battery pack.

16. The system of claim 1, wherein the one or more controllers are in electronic communication with one or more temperature sensors to monitor the battery temperature of the battery pack.

17. A method for calculating a final maximum power limit of a battery pack for an electric vehicle, the method comprising:

receiving, by one or more controllers, a voltage of the battery pack, a discharge current of the battery pack, a state-of-charge of the battery pack, a battery temperature of the battery pack, and a power request indicating an amount of power presently being requested from the battery pack;

interpolating a value indicating a direct current internal resistance of the battery pack from a plurality of DCIR look-up tables based on the discharge current, the state-of-charge, and the battery temperature of the battery pack, wherein a plurality of battery open circuit voltage look-up tables and the plurality of DCIR look-up tables are stored in memory of the one or more controllers;

interpolating a value indicating an open circuit voltage of the battery pack from the plurality of battery open circuit voltage look-up tables based on the state-of-charge and the battery temperature of the battery pack;

calculating a first maximum power limit of the battery pack based on the open circuit voltage, the direct current internal resistance, and the discharge current of the battery pack;

calculating a second maximum power limit of the battery pack based on the voltage of the battery pack, the state-of-charge of the battery pack, the battery temperature of the battery pack, and the power request;

comparing the first maximum power limit with the second maximum power of the battery pack; and selecting a maximum power value limit having the greatest value as the final maximum power of the battery pack.

18. The method of claim 17, further comprising:

determining a real-time power of the battery pack based on a real-time voltage of the battery pack and a real-time discharge current of the battery pack;

comparing the real-time power of the battery pack with the final maximum power limit of the battery pack; and in response to determining the real-time power of the battery pack is greater than the final maximum power limit of the battery pack, generating a control signal that instructs the battery pack to reduce the real-time power of the battery pack to the final maximum power limit of the battery pack.

19. The method of claim 17, further comprising determining the first maximum power limit and the second maximum power limit of the battery pack based on the following:

$$\text{Maximum Power Limit} = V_{OCV} * I_D - (I_D)^2 R_{DCIR}$$

wherein $V_{OCV}$ represents the open circuit voltage of the battery pack, $R_{DCIR}$ represents the direct current internal resistance of the battery pack, and $I_D$ represents the discharge current of the battery pack.

20. A system for calculating a maximum power limit of a battery pack for an electric vehicle, the system comprising:

one or more controllers in electronic communication with the battery pack, wherein a plurality of battery open circuit voltage look-up tables and a plurality of DCIR look-up tables are stored in memory of the one or more controllers, and wherein the one or more controllers execute instructions to:

receive, by the one or more controllers, a discharge current of the battery pack, a voltage of the battery pack, a state-of-charge of the battery pack, a battery temperature of the battery pack, and a power request indicating an amount of power presently being requested from the battery pack;

interpolate a value indicating a direct current internal resistance of the battery pack from the plurality of DCIR look-up tables based on the discharge current, the state-of-charge, and the battery temperature of the battery pack;

interpolate a value indicating an open circuit voltage of the battery pack from the plurality of battery open circuit voltage look-up tables based on the state-of-charge and the battery temperature of the battery pack;

calculate a first maximum power limit of the battery pack based on the open circuit voltage, the direct current internal resistance, and the discharge current of the battery pack;

calculate a second maximum power limit of the battery pack based on a voltage of the battery pack, the state-of-charge of the battery pack, the battery temperature of the battery pack, and the power request;

compare the first maximum power limit with the second maximum power of the battery pack;

select a maximum power value limit having the greatest value as a final maximum power limit of the battery pack;

determine a real-time power of the battery pack based on a real-time voltage of the battery pack and a real-time discharge current of the battery pack;

compare the real-time power of the battery pack with the final maximum power limit of the battery pack; and in response to determining the real-time power of the battery pack is greater than the final maximum power limit of the battery pack, generate a control signal that instructs the battery pack to reduce the real-time power of the battery pack to the final maximum power limit of the battery pack.

* * * * *